United States Patent
Wollak et al.

(10) Patent No.: US 12,097,822 B2
(45) Date of Patent: Sep. 24, 2024

(54) RESTRAINING HARNESS SYSTEM FOR PASSENGER VEHICLES

(71) Applicant: EZ-ON PRODUCTS, LLC, Jupiter, FL (US)

(72) Inventors: Marina Wollak, Jupiter, FL (US); Luke Wollak, Jupiter, FL (US)

(73) Assignee: EZ-ON PRODUCTS, LLC, Jupiter, FL (US)

( * ) Notice: Subject to any disclaimer, the term of this patent is extended or adjusted under 35 U.S.C. 154(b) by 0 days.

(21) Appl. No.: 18/449,952

(22) Filed: Aug. 15, 2023

(65) Prior Publication Data
US 2024/0051492 A1 Feb. 15, 2024

Related U.S. Application Data

(60) Provisional application No. 63/371,462, filed on Aug. 15, 2022.

(51) Int. Cl.
*B60R 22/12* (2006.01)
*B60R 22/10* (2006.01)
*B60R 22/18* (2006.01)
*B60R 22/26* (2006.01)

(52) U.S. Cl.
CPC ............ *B60R 22/12* (2013.01); *B60R 22/105* (2013.01); *B60R 22/18* (2013.01); *B60R 22/26* (2013.01)

(58) Field of Classification Search
CPC ....... B60R 22/12; B60R 22/18; B60R 22/105; B60R 22/26; B60R 22/00; B60R 22/14; A62B 35/0012; A62B 35/0006
See application file for complete search history.

(56) References Cited

U.S. PATENT DOCUMENTS

| | | | |
|---|---|---|---|
| 1,288,170 | A | 12/1918 | Pick |
| 1,816,262 | A | 7/1931 | Ritter |
| 2,677,488 | A | 5/1954 | Prusan |
| 2,833,344 | A | 5/1958 | Lucht |
| 2,856,991 | A | 10/1958 | Princiotta |

(Continued)

OTHER PUBLICATIONS

Baer, D. et al, "Where in my vehicle are the tether anchors?", The LATCH System, Internet article retrieved Oct. 11, 2023, https://thecarseatlady.com/where-in-my-vehicle-are-the-tether-anchors/, (2023).

(Continued)

*Primary Examiner* — Timothy Wilhelm
(74) *Attorney, Agent, or Firm* — McHale & Slavin, P.A.

(57) ABSTRACT

A restraining harness system is disclosed for securing a passenger to a vehicle seat in a passenger vehicle. The system includes a passenger restrain harness and a seat anchor. The seat anchor couples to the vehicle's tether anchor or can be adapted to couple to a seat frame to make a tether anchor, as is commonly known in the art for use with car seats for infants. Once the seat anchor is secured to the vehicle seat and the restraint harness is securely worn by the passenger, a pair of attachment straps passes through metal D-rings on the shoulders of the harness and securely attach to the seat anchor on the rear of the seat. Similarly, a second pair of attachment straps pass through D-rings on each side of the waist of the restraint harness and securely attach to the seat anchor, thus securing the passenger in the vehicle.

13 Claims, 4 Drawing Sheets

(56) References Cited

U.S. PATENT DOCUMENTS

| | | | |
|---|---|---|---|
| 2,879,078 A | 3/1959 | Dewees | |
| 3,028,200 A * | 4/1962 | Dye | B60R 22/105 297/484 |
| 3,099,486 A | 7/1963 | Scott | |
| 3,321,247 A * | 5/1967 | Dillender | A47D 15/006 297/484 |
| 3,322,102 A * | 5/1967 | Windle | A62B 35/0006 244/151 R |
| 3,380,776 A * | 4/1968 | Dillender | B60R 22/105 297/484 |
| 3,834,758 A | 9/1974 | Soule | |
| 4,205,670 A * | 6/1980 | Owens | B60R 22/105 297/464 |
| 4,226,474 A * | 10/1980 | Rupert | B60R 22/105 297/484 |
| 4,709,966 A | 12/1987 | Parkinson et al. | |
| 4,720,064 A * | 1/1988 | Herndon | B64D 17/30 244/122 AG |
| 5,076,598 A * | 12/1991 | Nauman | A47D 13/086 224/160 |
| 5,443,037 A | 8/1995 | Saleme | |
| 5,664,844 A | 9/1997 | Greene | |
| 5,733,014 A * | 3/1998 | Murray | B60R 22/14 297/484 |
| 6,089,662 A * | 7/2000 | Lambert | B60N 2/3084 297/238 |
| 6,402,251 B1 | 6/2002 | Stoll | |
| 6,547,334 B1 | 4/2003 | Girardin | |
| 6,871,360 B1 * | 3/2005 | Ashline | A42B 3/0473 2/468 |
| 6,969,122 B2 * | 11/2005 | Sachs | B60R 22/30 280/801.1 |
| 7,017,525 B2 * | 3/2006 | Leach | A61G 7/1023 224/160 |
| 7,347,494 B2 * | 3/2008 | Boyle | B60N 2/2887 297/254 |
| 7,357,099 B2 * | 4/2008 | Smith | A01K 27/002 119/856 |
| 7,699,402 B2 | 4/2010 | DeLellis et al. | |
| 8,210,617 B2 * | 7/2012 | Aaron | B60N 2/2866 297/484 |
| 8,622,431 B2 * | 1/2014 | Singh | A01K 1/0263 280/806 |
| 8,702,177 B1 * | 4/2014 | Hogue | A61F 5/3769 297/484 |
| 9,192,242 B1 * | 11/2015 | Anderson | B60R 22/10 |
| 9,284,754 B2 | 3/2016 | Stevens et al. | |
| 10,661,749 B2 | 5/2020 | Kim | |
| 10,933,785 B2 | 3/2021 | Kukielka | |
| 11,014,526 B1 | 5/2021 | Morgan | |
| 11,077,822 B2 * | 8/2021 | Macaluso | B60R 22/14 |
| 11,167,718 B2 * | 11/2021 | Archibald | B60R 22/105 |
| 11,198,412 B1 * | 12/2021 | Kim | B60R 22/14 |
| 11,932,195 B1 * | 3/2024 | Marshell | B60R 22/105 |
| 2004/0169411 A1 * | 9/2004 | Murray | B60R 22/105 280/801.1 |
| 2006/0163936 A1 * | 7/2006 | Millard | B60R 22/00 297/466 |
| 2009/0212549 A1 * | 8/2009 | Jones | B60R 22/14 280/801.2 |
| 2013/0249204 A1 * | 9/2013 | Fink | B60R 22/024 280/801.1 |
| 2019/0135225 A1 * | 5/2019 | Kim | B60R 22/20 |
| 2019/0270426 A1 * | 9/2019 | Archibald | B60R 22/105 |

OTHER PUBLICATIONS

Anonymous, "MAX Vest", E-Z-On Products, Inc., Internet article retrieved from School Transportation News Magazine on Oct. 11, 2023, https://ezonpro.com/products/transportation-vest/max-2-bus/, pp. 126-127, (2014).

Thomas, W., "Top tethers: a crucial piece of your child's car seat", Internet article retrieved Oct. 11, 2023, https://csftl.org/why-tethering-is-so-important/, pp. 1-4, (Apr. 2016).

Anonymous, BESI, Inc., Product Catalog, Retrieved from the Internet on Oct. 11, 2023, https://indd.adobe.com/view/f374da49-2b71-4acc-860c-a76c5e589776/, pp. 8-9, 16-17, (Mar. 2016).

* cited by examiner

RESTRAINING HARNESS SYSTEM FOR PASSENGER VEHICLES

CROSS-REFERENCE TO RELATED APPLICATIONS

In accordance with 37 C.F.R. § 1.76, a claim to the benefit of a prior filed application is included in an Application Data Sheet filed concurrently herewith. Accordingly, the present invention claims the benefit of the filing date of U.S. Provisional Patent Application No. 63/371,462, entitled "RESTRAINING HARNESS SYSTEM FOR PASSENGER VEHICLES", filed Aug. 15, 2022. The contents of the above referenced application are incorporated herein by reference in its entirety.

FIELD OF THE INVENTION

The present invention relates to a restraining harness system for securing a passenger to a passenger vehicle seat.

BACKGROUND OF THE INVENTION

Seatbelts are a common requirement in vehicles as a restraint to secure passengers in their seat and offer protection in the event of a car crash. Most commonly in passenger vehicles, these restraints include both a lap belt and a shoulder strap, both of which attach to the vehicle seat near a passenger's hip. In airplanes, passengers are usually only secured by a lap belt. In these common situations, a passenger needs only to disconnect the system at a single point, easily removing all restraints and protection. Often, removal is as simple as pushing a button.

There are groups of people, however, that require extra protection. For example, passengers with certain cognitive issues have a greater risk of removing these restraints and protections, even if instructed not to. Alternatively, passengers with muscular deficiencies who cannot maintain an upright position are not protected the way that the shoulder strap of a seatbelt is designed to protect them. In such situations, it can become necessary to provide an alternative restraint system which can be used to maintain the passenger in the correct position. This can be coupled with a release system whereby only a second passenger can release the system.

Similar systems have been employed in school busses for children with disabilities. Several years ago, E-Z-ON Products, Inc. of Florida (the predecessor to the current Applicant) created such a system which operated with its "Houdini Vest" and "Max Vest" products. Those products, however, were designed to cooperate with the traditional school bus bench seating and were not capable of being adapted to use in everyday passenger vehicles.

DESCRIPTION OF THE PRIOR ART

An early example of a restraint harness is disclosed in U.S. Pat. No. 4,226,474 issued to Rupert et al, which discloses a restraint vest that utilizes a pair of straps that laterally encircle the torso of the wearer with a pair of straps that extend from the anterior side of the torso over the shoulders to the posterior side of the torso. Anchoring straps are secured to the seat back or to the floor and fasten to the posterior side of the vest.

Expired U.S. Pat. No. 5,733,014 to Murray, which was assigned to E-Z-ON Products, Inc. of Florida, discloses a restraint harness for securing a passenger to a seat in a vehicle. The harness is particularly well adapted for transporting a passenger who is in a sitting position. The harness has a pair of lateral torso straps adapted to be placed around the torso of the passenger and fastened together. A pair of shoulder straps extend over the shoulders and intersect with the torso straps. A seat strap portion fastens to a seat back and fastens to the harness. An existing vehicle seat belt fastens to the torso straps to secure the passenger to the seat.

U.S. Pat. No. 7,699,402 to DeLellis et al. discloses a restraint system for securing a passenger to a seat in a motor vehicle. The restraint system is composed of a restraint belt removably attached to a vehicle seat having a plurality of vertical straps and an attachment mechanism for connecting said straps across the passenger's chest. Each of the vertical straps has a first end removably attached to a lap belt and a second end removably attached to a latch located behind the vehicle seat.

U.S. Pat. No. 9,284,754 to Stevens et al. discloses a restraint device and method for securing an individual in a vehicle. The device increases safety and security of an individual who is in custody. Further, the device increases the safety for an arresting or attending officer. The device is portable and can be used in a variety of vehicles and properly adapted modes of transportation. As presented, the device comprises three belts which coordinate and are sized to secure the individual in a seated position. Once secured with the device, the seated individual who has his hands cuffed behind his back is unable to maneuver his hands to the front of his body. Further, the individual's movements are restricted so that the individual is maintained in a fixed, upright seated position. The connections presented in the device allow for flexibility and ease of use by the user while preventing tampering by the individual being restrained.

U.S. Pat. No. 10,933,785 to Kukielka discloses a hi-back vehicle seat pad restraint system which includes a vehicle seat assembly having a vehicle seat back and a vehicle seat operatively connected to the vehicle seat back, a hi-back vehicle seat assembly operatively connected to the vehicle seat assembly, a vehicle safety belt assembly operatively connected to the vehicle seat assembly, wherein the vehicle safety belt assembly interacts with the hi-back vehicle seat assembly, a seat pad assembly located on the vehicle and attached to the vehicle seat assembly. Furthermore, the hi-back vehicle seat assembly can be equipped with a five (5) point harness. Also, the seat pad assembly can be equipped with a seat pad assembly restraining shoulder strap and a restraining shoulder strap connector to keep the shoulder portion of the vehicle seat belts correctly positioned over the torso of the end user.

U.S. Pat. No. 11,014,526 to Morgan discloses a child safety harness for securing children to a seat of a vehicle. The child safety harness comprises a pair of shoulder straps, a torso strap mounted to the pair of shoulder straps, and a back strap mounted to the pair of shoulder straps and the torso strap. As a result, the child safety harness was disclosed as fitting all children and relieving the discomfort caused by other harnesses. The child safety harness comprises a connector provided at the back strap. The connector allows the child safety harness to be easily removable from the seat of the car. The connector is used to mount the child safety harness to the seat belt via the back strap to secure the child to the seat of the vehicle. In one embodiment, the child safety harness is adapted to strap multiple children through the use of one lap belt and shoulder belt.

U.S. Pat. No. 11,198,412 to Kim et al. discloses accessory systems for enhancing the security of restraint systems used in a vehicle with a lap seatbelt system. A plurality of straps can be placed on the upper surface of a vehicle seat and configured to provide a secure connection between the shoulders of the restraint system and an upper portion of the vehicle seat, the anchoring system securing the torso of the individual to the seat back. An optional plurality of straps are configured to provide a supplemental connection between the anchoring system and a rear portion of the seat, tethering the anchoring system to the vehicle to anchoring structures in the floor of the vehicle or the bottom portion of the seat. The straps can be adjusted to accommodate different heights in wearer's seat backs, and vehicle seats, making the restraint user adjustable for use by different wearers and in different vehicles.

U.S. Pat. No. 11,167,718 to Archibald et al. discloses a seat mount to be used with a school bus restraint vest or harness that provides a means where the passenger seated in the restraint cannot easily remove himself or herself from the seat mount without the assistance of another individual. The upper attachment of the seat mount loops through D-rings on the passenger's vest, and then returns and attaches to the backside of the seat, out of the reach of the passenger. The straps of the upper attachment may also be independently adjusted after the seat mount is attached to the passenger wearing the vest. The lower attachment at the hips includes a deterrent in which the passenger cannot easily remove the snap hook from the D-ring. This is accomplished by using a metal O-ring that is slipped over the snap hook tongue, preventing it from opening. These improvements to the upper and lower attachments of the seat mount inhibit a student from getting up from a school bus seat when the child is not permitted to do so, thus providing protection for the student, driver and other passengers on the school bus.

SUMMARY OF THE INVENTION

The present invention provides a restraint harness system for use in a passenger vehicle to secure a wearer in a seat and prevent the wearer from being able to accidentally release the system. The system includes both a vest portion and a seat strap portion, where the seat strap can secure the wearer of the vest portion to a typical passenger vehicle seat.

Accordingly, it is a primary objective of the instant invention restraint harness for securing a passenger to a vehicle seat, wherein the restraint harness is adjustable in diameter and length to accommodate different passenger torso sizes.

It is a further objective of the instant invention to provide a seat strap which can secure a passenger to a passenger-vehicle seat where the passenger cannot release themselves without the aid of another person.

It is yet another objective of the instant invention that the vest portion of the present restraint system can also be used with prior art school bus seat restraint systems.

It is a still further objective of the invention that, in the event of an accident, the restraint system distributes forces more evenly throughout the harness and provides increased safety for the wearer.

Other objects and advantages of this invention will become apparent from the following description taken in conjunction with any accompanying drawings wherein are set forth, by way of illustration and example, certain embodiments of this invention. Any drawings contained herein constitute a part of this specification, including exemplary embodiments of the present invention, and illustrate various objects and features thereof.

DETAILED DESCRIPTION OF THE INVENTION

The following detailed description is merely exemplary in nature, and is not intended to limit the present invention to the embodiment disclosed herein. In the present embodiment, most of the straps are shown as being comprised of seatbelt webbing. Such webbing is advantageous for its strength for security and because there are numerous third-party products designed to be able to cut through such webbing in the case of an emergency. Though the present embodiment is contemplated as using such seatbelt webbing, the inventive concept disclosed herein is not so limited.

Figure 1:
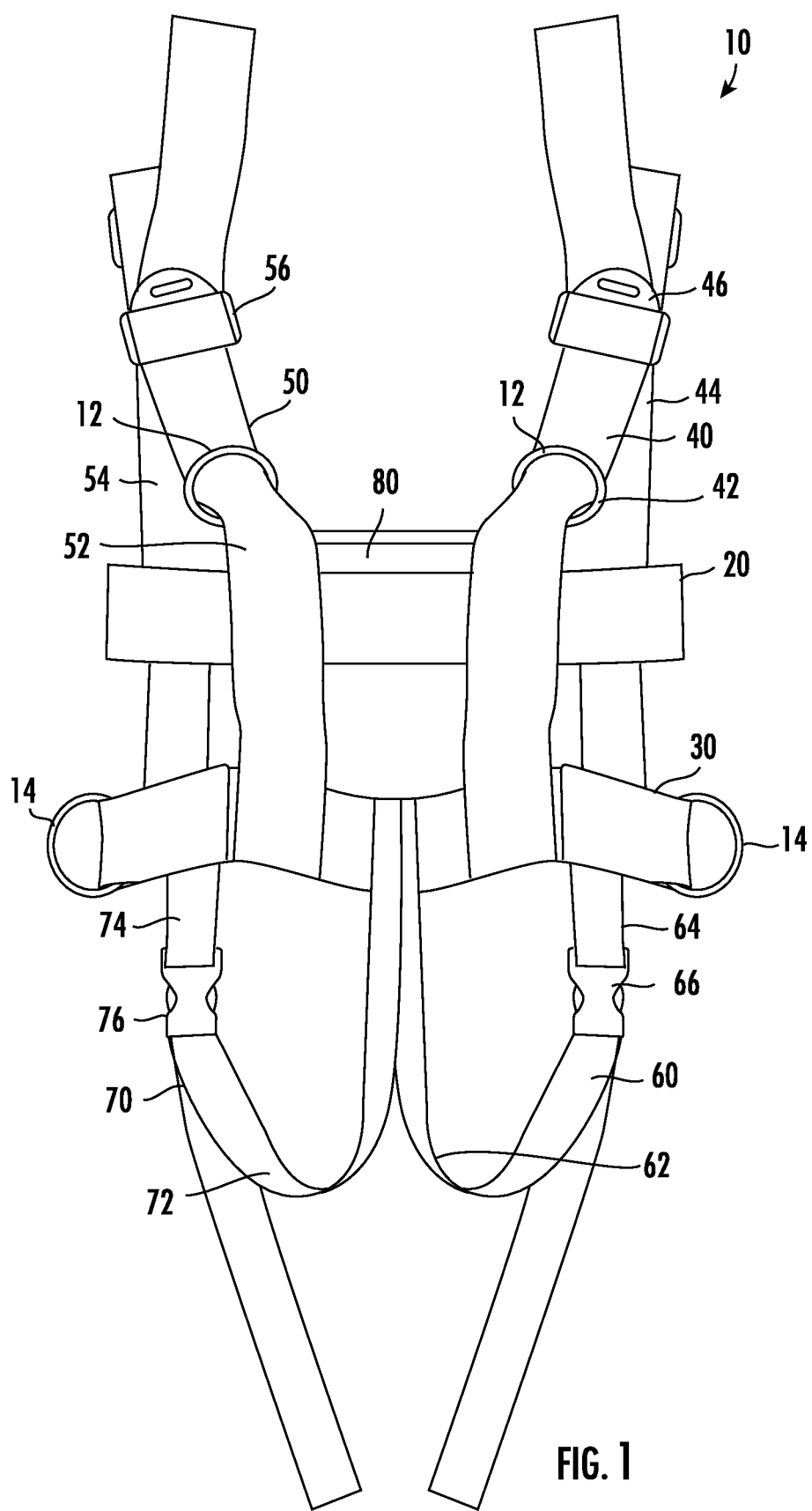
FIG. 1 is a front view of an embodiment of a restraint harness.
Figure 2:
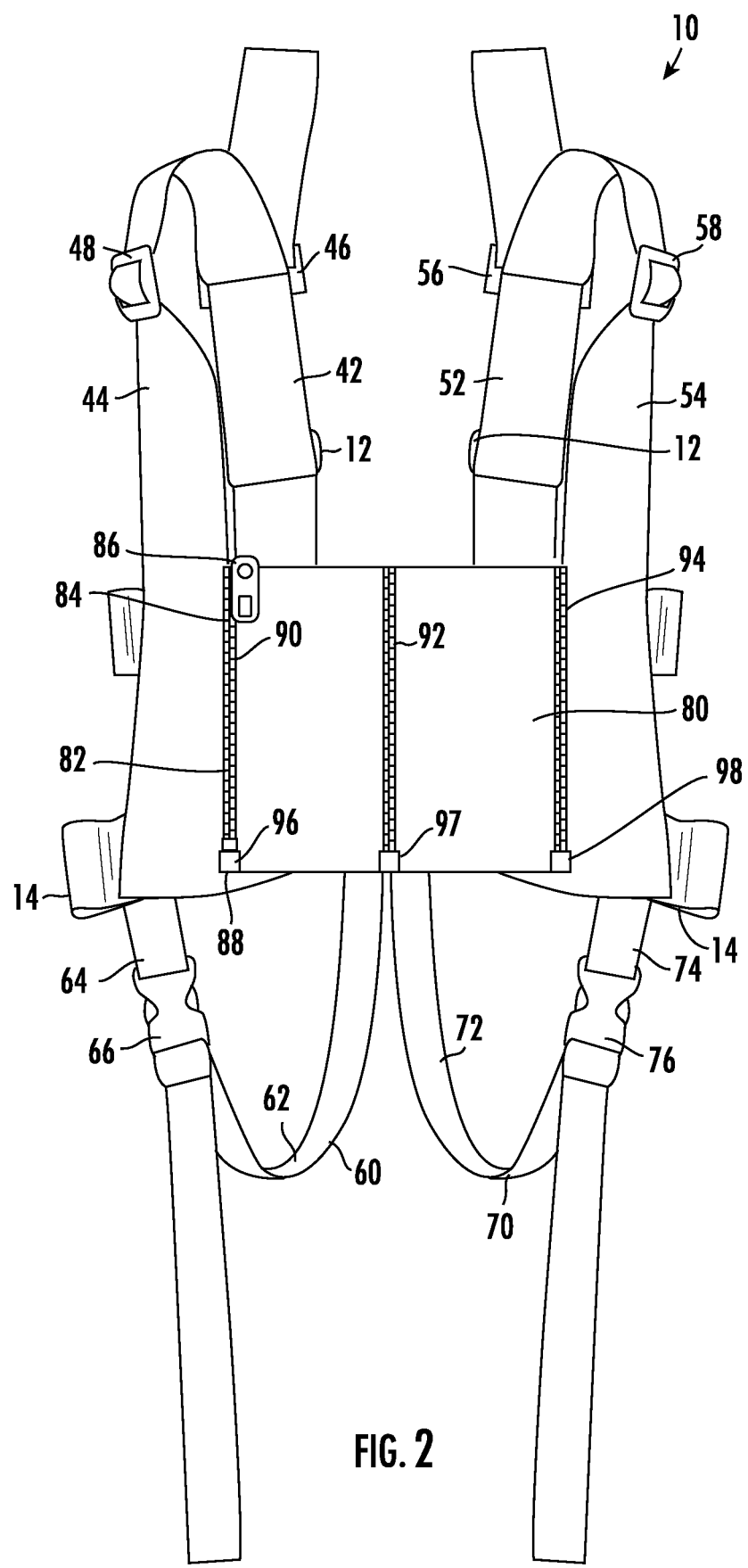
FIG. 2 is a rear view of an embodiment of a restraint harness.
Figure 3:
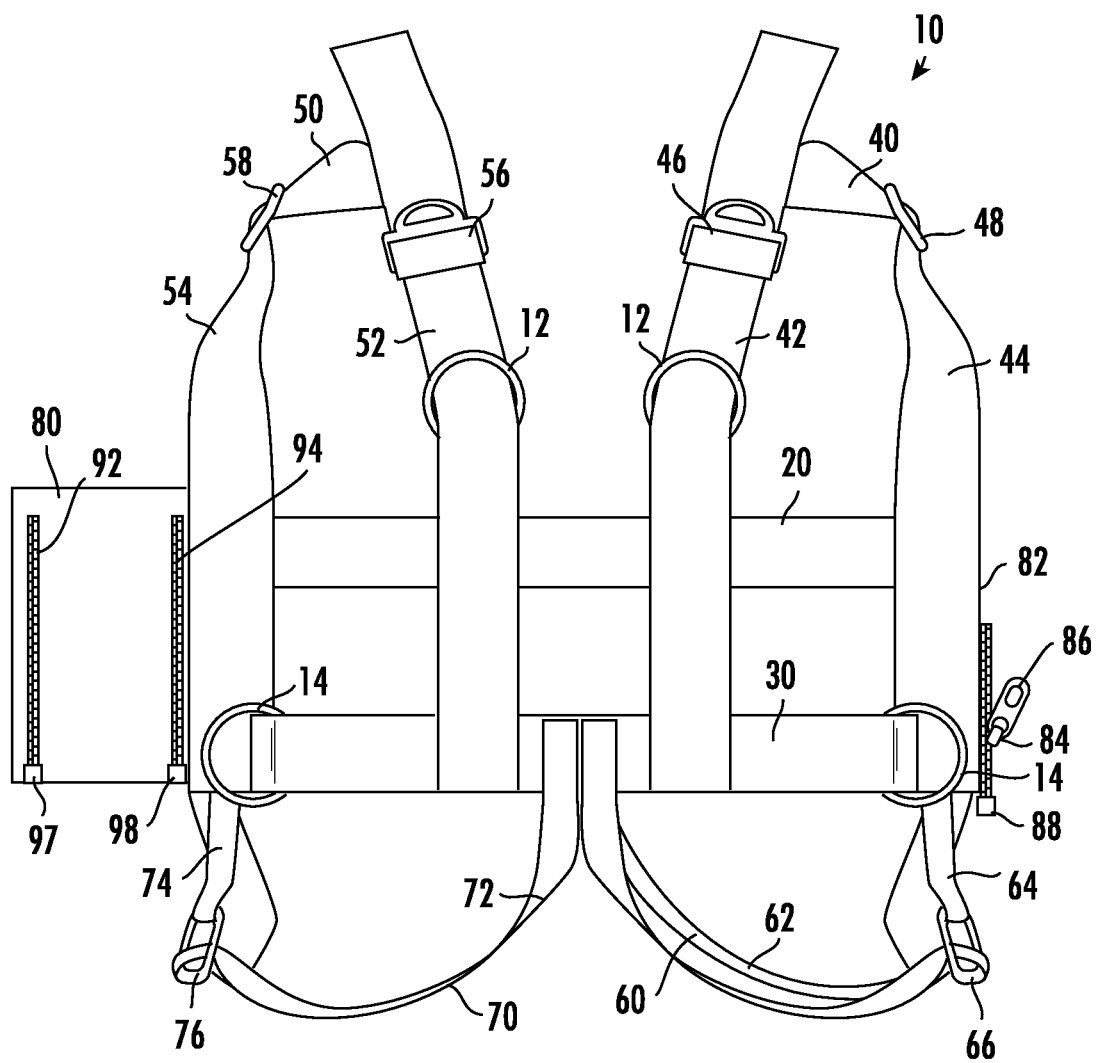
FIG. 3 is a front view of the embodiment of a restraint harness shown in FIG. 1 in an open condition.
Figure 4:
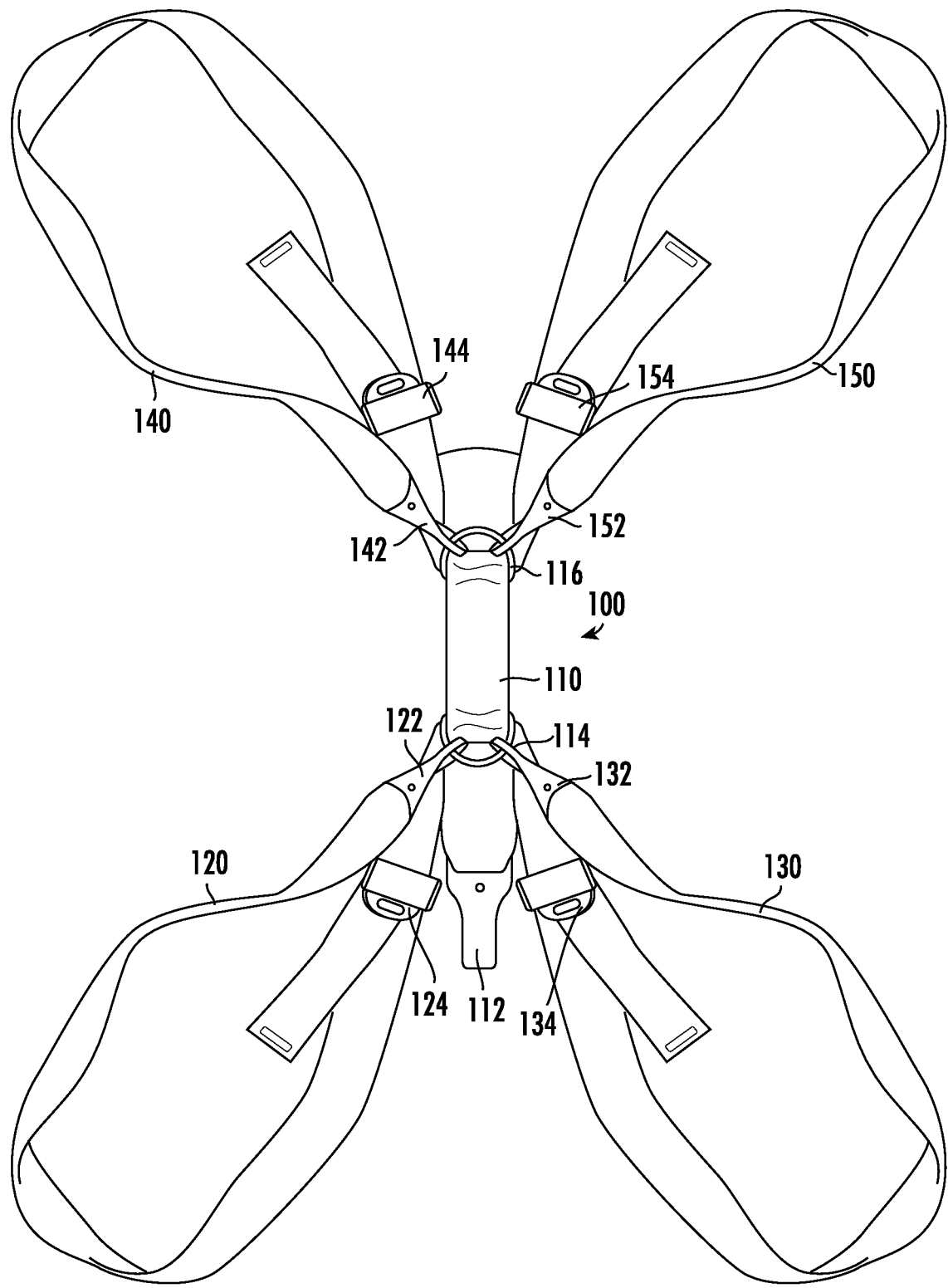
FIG. 4 is a plan view of an embodiment of a restraint harness seat anchor strap.

FIGS. 1-3 depict an embodiment of a restraint harness 10 as used in the present invention for securing a passenger to a vehicle seat in a seated position. The disclosed harness 10 includes a plurality of torso straps, including a chest strap 20, a waist strap 30, a left shoulder strap 40, a right shoulder strap 50, a left leg strap 60, and a right leg strap 70. On the back side of the harness 10, the disclosed embodiment includes an adjustment panel 80, which allows the circumferential size of the chest strap 20 and waist strap 30 to be adjusted to accommodate different sizes of users.

The left and right shoulder straps 40,50 include a front portion 42,52 and a back portion 44,54, which are attached with a buckle 46,56, allowing the length of the shoulder straps 40,50 to be adjusted to accommodate different height sizes of wearers. Additionally, secondary buckles 48,58 can be included on the back portions 44,54 so that any excess slack can be tucked out of the way.

The left and right leg straps 60,70 are attached to the waist strap 30 and include a front portion 62,72 attached to the front of the waist strap 30 and a back portion 64,74 attached to the back portion of the waist strap 30. The front portions 62,72 are attached to the back portions 64,74 with buckles 66,76, allowing the length of the leg straps 60,70 to be adjusted. In the disclosed embodiment, the buckles 66,76 also include compression fitting portions, allowing for a quick release of the leg straps 60,70 so that the leg straps 60,70 can be attached and detached while the restraint harness 10 is worn.

The adjustment panel 80 on the back side of the restraint harness 10 provides the ability for the waist strap 30 and torso strap 20 to be fit to the circumferential size of the user. The present embodiment accomplishes this by having the adjustment panel 80 securely attached to the back portion of the right shoulder strap 54 and provides for an adjustable fit between the adjustment panel 80 and the back portion of the left shoulder strap 44. In the disclosed embodiment, this is accomplished through a zipper connection, where the back portion of the left shoulder strap 44 includes a first half of the zipper teeth 82, including the slider 84 with pull tab 86 and box 88. The adjustment panel 80 includes a plurality of possible corresponding connections to secure the restraint harness 10 around a wearer.

As shown in FIGS. 2-3, the adjustment panel 80 includes different sets of zipper teeth 90,92,94, each including the pin 96,97,98 necessary to complete the zipper connection. While only three sets of secondary zipper teeth 90,92,94 are shown in the present embodiment, the invention is not so limited. Indeed, increasing the number of zipper teeth connections allows for sizes to be adjusted in smaller increments to provide a tighter fit.

The restraint vest 10 also includes a series of attachment rings 12, 14 or metal D-rings or the like to allow the vest to attach to a seat anchor 100. The left and right shoulder straps 40,50 each include an upper attachment ring or metal D-ring (or the like) 12 located so as to position the upper metal D-rings 12 at the approximate location of a wearer's shoulder. The waist strap 30 includes a lower pair of attachment rings or metal D-rings (or the like) 14 located so as to position the upper metal D-rings 14 at the approximate location at the side of a wearer's hips. When the seat anchor 100 attaches to the restraint vest 10 through the upper and lower metal D-rings 12,14, the wearer is then securely held in the seat.

The seat anchor 100 includes a central anchor strap 110 end with an anchor hook 112 on one end, designed to couple to a vehicle's tether anchor. The central anchor strap 110 also includes a first seat anchor strap metal D-ring or the like 114 and a second seat anchor strap metal D-ring or the like 116. It should be noted that while the preferred embodiment utilizes D-shaped rings, rings having other shapes, including circle rings, eye bolts, hoist rings, and the like, may be utilized without departing from the scope of the invention.

The central anchor strap 110 also includes a first pair of adjustable straps 120,130 which attach on their proximal end to a first portion of the central anchor strap 110, forming a V-shape. On the distal end of each adjustable strap 120,130 is an attachment clip 122,132. Each of the first adjustable straps includes a buckle 124,134, allowing the first pair of adjustable straps 120,130 to be adjusted in length for a proper fit.

On a second portion of the central anchor strap 110 is a second pair of adjustable straps 140,150. On the distal end of each adjustable strap 140,150 is an attachment clip 142,152. Each of the second adjustable straps includes a buckle 144,154, allowing the second pair of adjustable straps 140,150 to be adjusted in length for a proper fit.

To secure a passenger, the central anchor strap 110 is secured to the tether anchor in a vehicle with the anchor hook 112. Depending on the location of the vehicle tether anchor, the anchor hook 112 may be oriented upwards or downwards.

If, for example, the tether anchor is located in the upper seatback of the passenger vehicle seat, the adjustable straps 120,130, connected to the first portion of the central anchor strap 110, will be used in conjunction with the left and right shoulder strap first metal D-rings 12. In such an orientation, adjustable strap 130 will pass through the first metal D-ring 12 on the left shoulder strap 40, and then its adjustment clip 132 will loop back and attach to the D-ring 114 on the first portion of the central anchor strap 110. Similarly, adjustable strap 120 will pass through the first metal D-ring 12 on the right shoulder strap 50, and then its adjustment clip 122 will loop back and attach to the D-ring 114 on the first portion of the central anchor strap 110.

Depending on the location of the vehicle's tether anchor, the central anchor strap 110 may alternatively be oriented downward. In this alternative orientation, the adjustable straps 140,150 will work in cooperation with the restraint harness 10 shoulder first metal D-rings 12 and the adjustable straps 120,130 will work in cooperation with the waist strap 30 second metal D-rings 14.

An additional extension strap (not shown) can be used in order to extend the central anchor strap 110 as necessary for the anchor hook 112 to reach a tether anchor located in alternate locations of the vehicle, such as on the ceiling frame of the vehicle or the cargo floor. If the vehicle does not include a tether anchor, and if the vehicle configuration permits, an anchor can be made using the frame of a seat in a rear seat row, as is known in the prior art for use with infant car seats.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A restraint harness system for securing a passenger to a vehicle seat in a passenger vehicle, comprising:
a restraint harness portion and a seat anchor portion;
said restraint harness portion comprising a plurality of straps to encompass a user's torso, said restraint harness portion including a pair of upper attachment rings and a pair of lower attachment rings;
said seat anchor portion having a central anchor strap having a first portion and a second portion, said first portion having a first end and said second portion having a second end, said first end having an anchor hook, said anchor hook adapted and arranged to couple with a vehicle's tether anchor;
said central anchor strap having a first attachment ring and a second attachment ring;
said first portion of said central anchor strap having a pair of adjustable straps, each of said first portion pair of adjustable straps having a first end coupled to said first portion, a second end having an attachment clip, and an adjustment buckle located therebetween;
said second portion of said central anchor strap having a pair of adjustable straps, each of said second portion pair of adjustable straps having a first end coupled to said second portion, a second end having an attachment clip, and an adjustment buckle located therebetween;
wherein each of said first portion and said second portion adjustable straps constructed and attached to couple said central anchor strap to said restraint harness through said restraint harness upper and lower attachment rings.

2. The restraint harness system for securing a passenger to a vehicle seat in a passenger vehicle of claim 1, wherein said plurality of straps to encompass a passenger's torso includes a chest strap, a waist strap, a left shoulder strap, a right shoulder strap, a left leg strap, and a right leg strap.

3. The restraint harness system for securing a passenger to a vehicle seat in a passenger vehicle of claim 2, wherein said left shoulder strap is adjustable in length and said right shoulder strap is adjustable in length.

4. The restraint harness system for securing a passenger to a vehicle seat in a passenger vehicle of claim 2, wherein said left shoulder strap includes an adjustment buckle and said right shoulder strap includes an adjustment buckle.

5. The restraint harness system for securing a passenger to a vehicle seat in a passenger vehicle of claim 2, wherein said left leg strap is adjustable and said right leg strap is adjustable.

6. The restraint harness system for securing a passenger to a vehicle seat in a passenger vehicle of claim 2, wherein said left leg strap includes an adjustment buckle and said right leg strap includes an adjustment buckle.

7. The restraint harness system for securing a passenger to a vehicle seat in a passenger vehicle of claim 2, wherein said left leg strap includes a quick-release adjustment buckle and said right leg strap includes a quick-release adjustment buckle.

8. The restraint harness system for securing a passenger to a vehicle seat in a passenger vehicle of claim 1, wherein said restraint harness includes a front side and a back side, said back side of said restraint harness includes an adjustment panel.

9. The restraint harness system for securing a passenger to a vehicle seat in a passenger vehicle of claim 1, wherein said central anchor strap first attachment ring is coupled to said central anchor first portion and said central anchor strap second attachment ring is coupled to said central anchor second portion.

10. The restraint harness system for securing a passenger to a vehicle seat in a passenger vehicle of claim 1, wherein said central anchor strap has an adjustable length.

11. A vehicle seat anchor system for use with a passenger restraint harness, comprising:
a central anchor strap having a first portion and a second portion, said first portion having a first end and said second portion having a second end, said first end having an anchor hook, said anchor hook adapted and arranged to couple with a vehicle's tether anchor;
said central anchor strap having a first attachment ring and a second attachment ring;
said first portion of said central anchor strap having a pair of adjustable straps, each of said first portion pair of adjustable straps having a first end coupled to said first portion, a second end having an attachment clip, and an adjustment buckle located between therebetween;
said second portion of said central anchor strap having a pair of adjustable straps, each of said second portion pair of adjustable straps having a first end coupled to said second portion, a second end having an attachment clip, and an adjustment buckle located therebetween;
wherein said first portion pair of adjustable straps and said second portion pair of adjustable straps are each constructed and arranged to cooperate with a restraint harness by passing each of said adjustable straps through a cooperating portion of said restraint harness and then loop back so that said attachment clips of said first portion pair of adjustable straps couple to said first attachment ring, and so that said attachment clips of said second portion pair of adjustable straps couple to said second attachment ring.

12. The vehicle seat anchor system for use with a passenger restraint harness of claim 11, wherein said first attachment ring is coupled to said central anchor strap first portion and said second attachment ring is coupled to said central anchor strap second portion.

13. The vehicle seat anchor system for use with a passenger restraint harness of claim 11, wherein said central anchor strap has an adjustable length.

* * * * *